(12) United States Patent
Kick et al.

(10) Patent No.: US 11,796,072 B2
(45) Date of Patent: Oct. 24, 2023

(54) MIXING CARTRIDGE WITH WEDGE-SHAPED VERTEBRAL BODIES

(71) Applicant: Grohe AG, Hemer (DE)

(72) Inventors: Jonas Kick, Menden (DE); Ole Benedikt Kostorz, Menden (DE)

(73) Assignee: GROHE AG, Hemer (DE)

( * ) Notice: Subject to any disclaimer, the term of this patent is extended or adjusted under 35 U.S.C. 154(b) by 0 days.

(21) Appl. No.: 17/772,734

(22) PCT Filed: Sep. 18, 2020

(86) PCT No.: PCT/EP2020/076105
§ 371 (c)(1),
(2) Date: Apr. 28, 2022

(87) PCT Pub. No.: WO2021/083576
PCT Pub. Date: May 6, 2021

(65) Prior Publication Data
US 2022/0341497 A1    Oct. 27, 2022

(30) Foreign Application Priority Data

Oct. 28, 2019   (DE) .................. 10 2019 129 058.9

(51) Int. Cl.
*F16K 11/044*   (2006.01)
*F16K 11/00*    (2006.01)
(Continued)

(52) U.S. Cl.
CPC .......... *F16K 11/044* (2013.01); *F16K 19/006* (2013.01); *F16K 31/002* (2013.01); *G05D 23/1346* (2013.01)

(58) Field of Classification Search
CPC ............. G05D 23/1346; G05D 23/134; G05D 23/1353; Y10T 137/86815; Y10T 137/86879
(Continued)

(56) References Cited

U.S. PATENT DOCUMENTS

2003/0075611 A1\* 4/2003 Eveleigh ............ G05D 23/1346
236/101 D
2006/0090798 A1\* 5/2006 Beagen ................ G05D 23/134
137/602
(Continued)

FOREIGN PATENT DOCUMENTS

DE         196 10 778      9/1997
DE    10 2007 055 455     5/2009
(Continued)

OTHER PUBLICATIONS

International Search Report dated Dec. 7, 2020 in International (PCT) Application No. PCT/EP2020/076105.

*Primary Examiner* — Robert K Arundale
(74) *Attorney, Agent, or Firm* — Wenderoth, Lind & Ponack, L.L.P.

(57) ABSTRACT

A mixing cartridge (1) for a sanitary faucet, comprising at least:
a mixing chamber (2) having at least one hot-water inlet (3) for hot water and at least one cold-water inlet (4) for cold water, and
a vortex element (5) for at least partially swirling the hot water and the cold water in the mixing chamber (2), wherein the vortex element (5) comprises a plurality of outer wedge-shaped vortex bodies (6) and a plurality of inner wedge-shaped vortex bodies (7).

15 Claims, 2 Drawing Sheets

(51) Int. Cl.
*F16K 31/00* (2006.01)
*G05D 23/13* (2006.01)

(58) Field of Classification Search
USPC .................. 236/12.1, 12.11, 12.16, 12.2
See application file for complete search history.

(56) References Cited

U.S. PATENT DOCUMENTS

| | | | |
|---|---|---|---|
| 2006/0231636 A1* | 10/2006 | Schmitt | F16K 19/006 |
| | | | 236/12.11 |
| 2008/0191043 A1 | 8/2008 | Goncze | |
| 2013/0099007 A1 | 4/2013 | Baker | |
| 2022/0025983 A1* | 1/2022 | Tueshaus | G05D 23/1353 |

FOREIGN PATENT DOCUMENTS

| | | |
|---|---|---|
| EP | 1 496 415 | 1/2005 |
| EP | 2 407 849 | 1/2012 |
| JP | 2008-202702 | 9/2008 |
| WO | 97/32147 | 9/1997 |

* cited by examiner

MIXING CARTRIDGE WITH WEDGE-SHAPED VERTEBRAL BODIES

This invention relates to a mixing cartridge for a sanitary faucet, which can be used to mix cold water and hot water to form a mixed water having a desired mixed-water temperature. Sanitary faucets are used in particular to provide a mixed water supply on demand at a washbasin, a sink, a shower or a bathtub.

Mixing cartridges, in which an expansion element can regulate the mixed-water temperature of the mixing water, are known. Because the distance the cold water and hot water travel to reach the expansion element is very short, the cold water and hot water are often not well mixed by the time they reach the expansion element. Owing to the flow conditions in the mixing cartridges, the temperature present at the expansion element sometimes deviates significantly from the mixed-water temperature of the (completely mixed) mixed water, i.e., the expansion element cannot optimally regulate the mixed-water temperature.

Therefore, the invention addresses the problem of solving at least a part of the issues described with reference to the prior art and, in particular, of providing a mixing cartridge for a sanitary faucet, which can render the mixed-water temperature of the mixed water easier to regulate.

This problem is solved by a mixing cartridge according to the features of the independent claim. Further advantageous embodiments of the mixing cartridge are specified in the dependent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

A mixing cartridge having at least the components listed below contributes to solving the problem:
- a mixing chamber having at least one hot-water inlet for hot water and at least one cold-water inlet for cold water, and
- a vortex element for at least partially swirling the hot water and the cold water in the mixing chamber, wherein the vortex element comprises a plurality of outer wedge-shaped vortex bodies and a plurality of inner wedge-shaped vortex bodies.

The mixing cartridge can be used in particular with a sanitary faucet that can be used to provide a mixed water supply on demand at a washbasin, a sink, a shower or a bathtub. For this purpose, in particular cold water at a cold-water temperature and hot water at a hot-water temperature can be routed to the mixing cartridge. The mixing cartridge can be used to mix the cold water and the hot water to form a mixed water having a desired mixed-water temperature. The mixed-water temperature can be regulated in particular by a regulating element, for instance as an expansion element, of the mixing cartridge. The cold-water temperature is in particular at most 25° C. (Centigrade), preferably 1° C. to 25° C., particularly preferably 5° C. to 20° C. and/or the hot-water temperature is in particular at most 90° C., preferably 25° C. to 90° C., particularly preferably 55° C. to 65° C. The mixing cartridge can be disposed for instance in a faucet housing of the sanitary faucet. In particular, the faucet housing is at least partially made of plastic and/or (cast) metal, such as brass. The faucet housing can be attached to a support, such as a countertop, a sink, a washbasin, a bathtub, or a shower.

The mixing cartridge has a mixing chamber, in which the hot water and cold water can be mixed. In particular, the mixing chamber is formed within a housing of the mixing cartridge, which is in particular (largely) tubular and/or extends along a longitudinal axis. At least one hot-water inlet for the hot water and at least one cold-water inlet for the cold water open into the mixing chamber. A vortex element is disposed within the mixing chamber, which is used to at least partially swirl the hot water and the cold water in the mixing chamber. To this end, the vortex element includes a plurality of outer wedge-shaped vortex bodies and a plurality of inner wedge-shaped vortex bodies. The terms "outer" and "inner" refer in particular to a radial direction, i.e., in particular orthogonal to the longitudinal axis, of the mixing cartridge and the vortex element, respectively. Therefore, the outer wedge-shaped vortex bodies are disposed further outwards in the radial direction than the inner wedge-shaped vortex bodies. However, the outer wedge-shaped vortex bodies and the inner wedge-shaped vortex bodies are in particular disposed directly next to each other or touch each other in the radial direction. "Wedge-shaped" in this context denotes, in particular, the vortex bodies having a pointed head or edge or area. The vortex bodies become wider starting from the pointed head or from the pointed edge or the pointed area, in particular in the flow direction of the cold water and hot water and/or a longitudinal direction of the mixing cartridge. The width of the vortex bodies increases in particular in a circumferential direction of the mixing cartridge. A thickness of the vortex bodies in the radial direction is in particular (largely) constant. The longitudinal direction extends in particular in parallel to the longitudinal axis. The vortex bodies may each be formed of two legs extending in a V-shape from the pointed head (or edge or area). The legs may have a foot at their ends opposite from the head. The individual outer wedge-shaped vortex bodies and the individual inner wedge-shaped vortex bodies are, in particular, identically formed. Furthermore, the vortex element may comprise, for instance, 2 to 20 outer wedge-shaped vortex bodies and/or 2 to 20 inner wedge-shaped vortex bodies. The outer wedge-shaped vortex bodies and the inner wedge-shaped vortex bodies swirl the hot water and cold water in the mixing chamber at least partially (in the radial direction). This permits an inner flow layer (e.g. of hot water) to be drawn off the regulating element and at least partially swirled with an outer flow layer (e.g. of cold water). As a result, a mean value of the temperature at the regulating element matches the mixed-water temperature after the hot water and cold water have been completely mixed more thoroughly, improving the regulating behavior of the mixing cartridge.

The outer wedge-shaped vortex bodies and the inner wedge-shaped vortex bodies may be formed at a sleeve. In particular, the sleeve is at least partially tubular. Further, the outer wedge-shaped vortex bodies and the inner wedge-shaped vortex bodies are formed in particular at an inner peripheral surface of the sleeve.

The outer wedge-shaped vortex bodies and the inner wedge-shaped vortex bodies may be disposed in an annular manner.

The outer wedge-shaped vortex bodies may be spaced apart from one another in a circumferential direction. This can mean that channels are formed between the individual outer wedge-shaped vortex bodies, through which the hot water and cold water can flow.

The inner wedge-shaped vortex bodies may be spaced apart from one another in a circumferential direction. This can mean that channels are formed between the individual inner wedge-shaped vortex bodies, through which the hot water and cold water can flow.

The outer wedge-shaped vortex bodies and the inner wedge-shaped vortex bodies may be offset from one another in a circumferential direction. In particular, this can mean that the outer wedge-shaped vortex bodies and inner wedge-shaped vortex bodies are not (completely) aligned with one another in the radial direction.

The inner wedge-shaped vortex bodies may be attached to the outer wedge-shaped vortex bodies. In particular, the inner wedge-shaped vertebral bodies may be bonded to the outer wedge-shaped vertebral bodies. Furthermore, the inner wedge-shaped vortex bodies are attached to the outer wedge-shaped vortex bodies, in particular (only) at the feet of the legs.

The vortex element may encompass a regulating element for regulating the mixed-water temperature of the mixed water. In particular, this can also mean that the regulating element extends through the vortex element. The regulating element is designed in particular in the manner of an expansion element.

The vortex element can be disposed in an annular gap between the regulating element and the housing of the mixing cartridge. In so doing, the outer wedge-shaped vortex bodies can touch the housing in particular in the radial direction and/or the inner wedge-shaped vortex bodies can touch the regulating element in particular in the radial direction.

The mixing cartridge may include a control gate valve for regulating a flow of the hot water through the hot-water inlet and a flow of the cold water through the cold-water inlet, wherein the regulating element can move the control gate valve in an axial direction of the mixing cartridge, and wherein a first number of cold-water channels for the cold water and a second number of hot-water channels for the hot water are formed in the control gate valve, and wherein the first number and the second number deviate from a third number of the outer wedge-shaped vortex bodies and a fourth number of the inner wedge-shaped vortex bodies. The control gate valve can be used to at least partially close and open the hot-water inlet or a hot-water regulating gap and the cold-water inlet or a cold-water regulating gap to control a mixing ratio between the hot water and the cold water for regulating the mixed-water temperature. The number of cold-water channels and hot-water channels, which differs from the number of outer and inner wedge-shaped vortex bodies, results in an unequal distribution of the outer and inner wedge-shaped vortex bodies on the one hand and the cold-water channels and hot-water channels on the other hand. This further improves the turbulence of the hot water and the cold water.

The invention and the technical environment are explained in more detail below with reference to the figures. It should be noted that the figures show a particularly preferred embodiment variant of the invention, but the invention is not limited thereto. The same reference signs are used for the same components in the figures. In an exemplary and schematic manner FIG. 1 shows a longitudinal section of a mixing cartridge;

Figure 1:
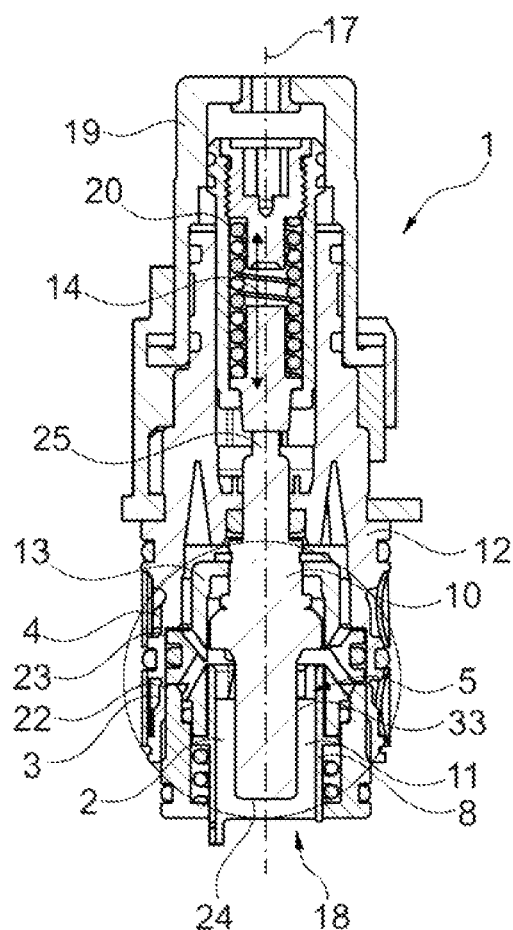
FIG. 1 shows a longitudinal section of a mixing cartridge 1, which can be used to generate a mixed water having a mixed-water temperature from a cold water and a hot water.

The mixing cartridge 1 has a housing 12 that is (substantially) tubular in shape and extends along a longitudinal axis 17 of the mixing cartridge 1. At least one hot-water inlet 3 and at least one cold-water inlet 4 are formed in the housing 12. The embodiment variant of the mixing cartridge shown here has a plurality of hot-water inlets 3 and cold-water inlets 4 distributed in a circumferential direction 9 of the housing 12 shown in FIG. 2. The hot water can be routed into a mixing chamber 2 of the mixing cartridge 1 via the hot-water inlets 3 and the cold water can be routed into the mixing chamber via the cold-water inlets 4. Consequently, the mixing chamber 2 is disposed downstream of the hot-water inlets 3 and of the cold-water inlets 4. The mixing chamber 2 starts in an area where the hot water and cold water meet. The hot water and the cold water can at least partially be mixed to a mixed water at a mixed-water temperature in the mixing chamber 2. A mixed water outlet 18, through which mixed water outlet the mixed water can leave the mixing cartridge 1 at the mixed-water temperature, is disposed downstream of the mixing chamber 2. The mixed water can be routed to a sanitary faucet, for instance, from the mixed water outlet 18.

The mixed-water temperature of the mixed water is determined by a mixing ratio between the hot water and the cold water and a hot-water temperature of the hot water and a cold-water temperature of the cold water. To set the mixed-water temperature, the mixing cartridge 1 has an operating element 19, which is connected to a screw element 20 by means of a screw connection. Rotating the operating element 19 results in the screw element 20 being moved by the screw connection in an axial direction 14, i.e., in parallel to the longitudinal axis 17. The movement of the screw element 20 in the axial direction 14 is transmitted to a regulating element 10, which in turn moves a control gate valve 13 in the axial direction 14. Depending on the position of the control gate valve 13 in the axial direction, it can alternately open and close a hot-water regulating gap 22 and a cold-water regulating gap 23. Depending on the position of the control gate valve 13, a corresponding amount of hot water and cold water is routed to the mixing cartridge 1 through the hot-water regulating gap 22 and the cold-water regulating gap 23, from which amount of hot water and cold water the mixed water is mixed at a corresponding mixed-water temperature. In this embodiment variant of the mixing cartridge 1, the hot-water regulating gap 22 and the cold-water regulating gap 23 extend around the mixing cartridge 1 in the circumferential direction 9 (cf. FIG. 2). The regulating element 10 may be at least partially made of a thermal expansion material. As a result, the regulating element 10 expands, particularly in the axial direction 14, when it is heated, and contracts, particularly in the axial direction 14, when it is cooled. In this way the regulating element 10 can maintain the mixed water at a (substantially) constant mixed-water temperature. If, for instance, too much hot water or too little cold water flows into the mixing cartridge 1, the regulating element 10 heats up and expands, causing it to move the control gate valve 13 in the axial direction 14 towards the mixed water outlet 18 decreasing the hot-water regulating gap 22 and increasing the cold-water regulating gap 23. Then, less hot water and more cold water flows into the mixing chamber 2. If, for instance, too much cold water or too little hot water flows into the mixing cartridge 1, the regulating element 10 contracts, causing it to move the control gate valve 13 away from the mixed water outlet 18, increasing the hot-water regulating gap 22 and decreasing the cold-water regulating gap 23. Then, more hot water and less cold water flows into the mixing chamber 2. The regulating element 10 has, in the axial direction 14, a first end 24 oriented towards the mixed water outlet 18 and, in the axial direction 14, a second end 25 opposite from the first end 24 and interacting with the screw element 20. A sleeve 8 having a vortex element 5 is disposed in an annular gap 11 between the regulating element 10 and the housing 12, which vortex element is used to at least partially agitate the hot water and the cold water in the mixing chamber 2.

Figure 2:
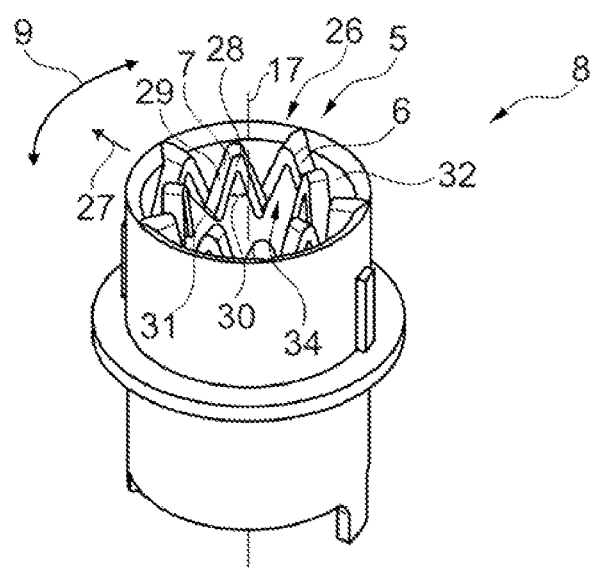
FIG. 2 shows a sleeve of the mixing cartridge having a vortex element.

FIG. 2 shows a perspective view of the sleeve 8 having a vortex element 5. The vortex element 5 is formed at a first longitudinal end 26 of the sleeve 8 and comprises outer wedge-shaped vortex elements 6 and inner wedge-shaped vortex elements 7 in a radial direction 27, i.e., orthogonal to the longitudinal axis 17. Every vortex body 6, 7 has a head 28 and two legs 29 extending from the head 28, between which (in the circumferential direction 9) an angle 30 is formed. The legs 29 each have a foot 31 at their ends opposite from the head 28. The individual outer wedge-shaped vortex bodies 6 and the individual inner wedge-shaped vortex bodies 7 are (largely) identical. The outer wedge-shaped vortex bodies 6 are formed on an inner circumferential surface 32 of the sleeve 8, whereas the feet 31 of the inner wedge-shaped vortex bodies 7 are attached to the feet 31 of the outer wedge-shaped vortex bodies.

In this case, the sleeve 8, the outer wedge-shaped vortex bodies 6 and the inner wedge-shaped vortex bodies 7 are formed integrally, for instance as an injection-molded plastic component.

Furthermore, the outer wedge-shaped vortex bodies 6 and the inner wedge-shaped vortex bodies 7 are disposed annularly around the longitudinal axis 17. In addition, the outer wedge-shaped vortex bodies 6 are spaced apart from one another in the circumferential direction 9 such that the cold water and the hot water can flow between the individual outer wedge-shaped vortex bodies 6. The inner wedge-shaped vortex bodies 7 are also spaced apart from one another in the circumferential direction 9 such that the cold water and the hot water can flow between the individual inner wedge-shaped vortex bodies 7. In addition, the outer wedge-shaped vortex bodies 6 and the inner wedge-shaped vortex bodies 7 also offset from one another in the circumferential direction 9. In particular, this means that the inner wedge-shaped vortex bodies 7 are not aligned with the outer wedge-shaped vortex bodies 6 in the radial direction 27. The inner wedge-shaped vortex bodies 7 abut (in the radial direction 27) on the inside against an outer circumferential surface 33 of the regulating element 10 shown in FIG. 1, filling the annular gap 11 in the radial direction 27.

The cold water and hot water flowing into the mixing chamber 2 thus first meet the heads 28 of the outer wedge-shaped vortex bodies 6 and inner wedge-shaped vortex bodies 7 in the mixing chamber 2. The legs 29 of the outer wedge-shaped vortex bodies 6 and of the inner wedge-shaped vortex bodies 7 subsequently taper in the direction of the longitudinal axis 17, such that the cold water and hot water flowing in the area of the outer wedge-shaped vortex bodies 6 is at least partially swirled (in the radial direction 27) with the cold water and the hot water flowing in the area of the inner wedge-shaped vortex bodies 7. The swirled cold water and hot water then leaves the vortex element 5 through the channels 34 formed in the circumferential direction 9 between the individual outer wedge-shaped vortex bodies 6 and inner wedge-shaped vortex bodies 7.

Figure 3:
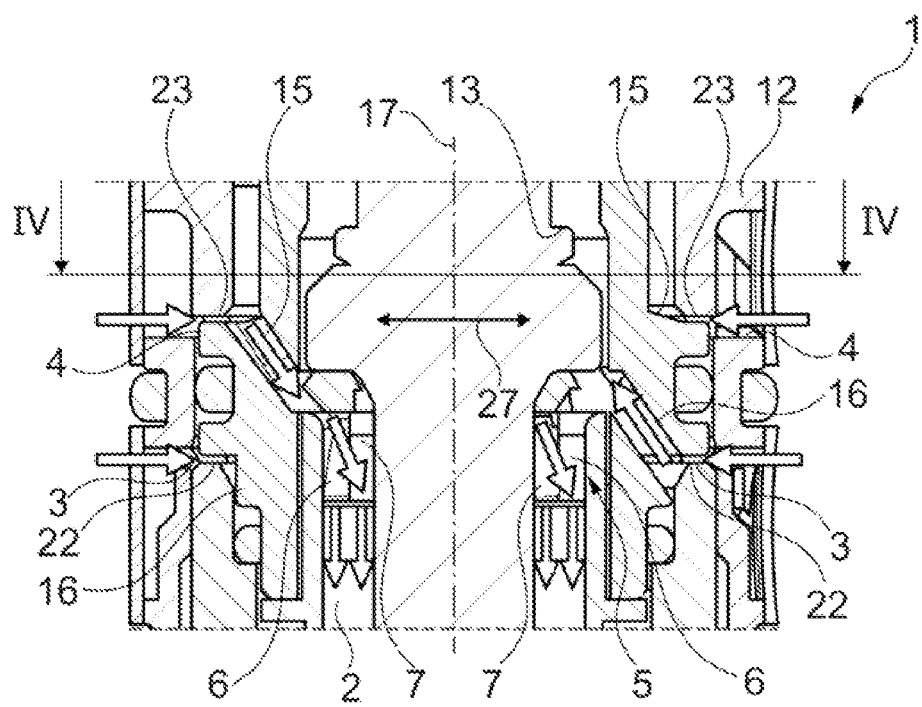
FIG. 3 shows a detailed view of the mixing cartridge.

FIG. 3 shows an enlarged view of the area of the mixing cartridge 1 marked with a circle in FIG. 1. The hot-water inlets 3 and cold-water inlets 4 of the housing 12 are depicted there. Starting from the hot-water inlets 3, the hot water flows through the hot-water regulating gaps 22 and hot-water channels 16 of the control gate valve 13 into the mixing chamber 2. Accordingly, the cold water flows from the cold-water inlets 4 through the cold-water regulating gaps 23 and the cold-water channels 15 of the control gate valve 13 into the mixing chamber 2. In FIG. 3 arrows are used to show the flow pattern of the hot water and cold water. In the mixing chamber 2, the hot water and the cold water hit the vortex element 5 and are at least partially swirled in the radial direction 27 by the outer wedge-shaped vortex bodies 6 and inner wedge-shaped vortex bodies 7.

Figure 4:
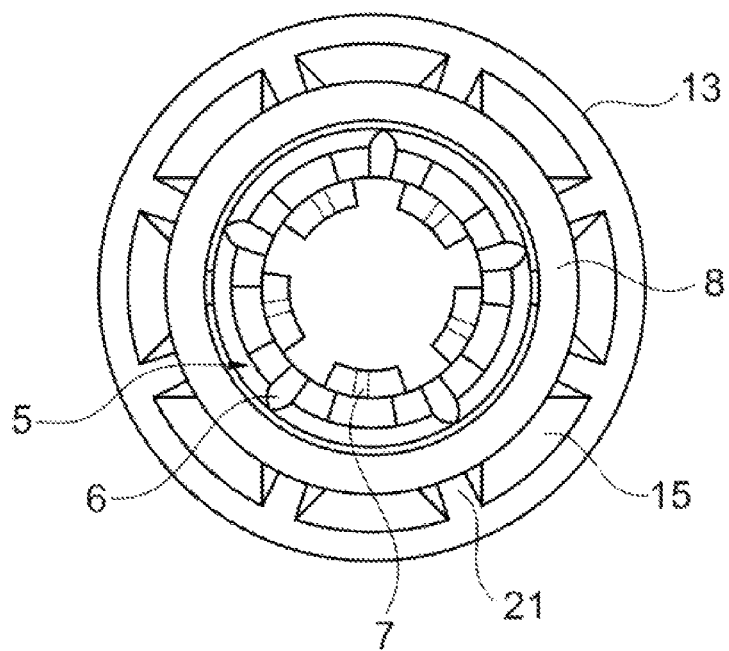
FIG. 4 shows the sleeve and a control gate valve of the mixing cartridge in cross-section.

FIG. 4 shows a sectional view of the sleeve 8 and the control gate valve 13 along the sectional line IV-IV shown in FIG. 3. There it can be seen that eight cold-water channels 15 are formed in the control gate valve 13, through which the cold water flows from the cold-water regulating gap 23 shown in FIG. 3 to the vortex element 5. Ribs 21 separate the individual 15 from one another. The hot-water channels 16 of the control gate valve 13 shown in FIG. 3 are largely identical in design to the cold-water channels 15 shown in FIG. 4. In particular, the control gate valve 13 also comprises eight cold-water channels 15; moreover, FIG. 4 shows the vortex element 5 comprising five outer wedge-shaped vortex bodies 6 and five inner wedge-shaped vortex bodies 7. Therefore, the number of cold-water channels and the number of hot-water channels deviate from the number of outer wedge-shaped vortex bodies 6 and the number of inner wedge-shaped vortex bodies 7, respectively. This forms an unequal distribution of the vortex bodies 6, 7 and the control gate valve 13, which results in a higher turbulence of the hot water and the cold water.

This invention improves the regulating behavior of the mixing cartridge.

LIST OF REFERENCE NUMERALS 1 mixing cartridge
2 mixing chamber
3 hot-water inlet
4 cold-water inlet
5 vortex element
6 outer wedge-shaped vortex body
7 inner wedge-shaped vortex body
8 sleeve
9 circumferential direction
10 regulating element
11 annular gap
12 housing
13 control gate valve
14 axial direction
15 cold water channel
16 hot-water channel
17 longitudinal axis
18 mixed-water outlet
19 operating element
20 screw element
21 ribs
22 hot-water regulating gap
23 cold-water regulating gap
24 first end
25 second end
26 first longitudinal end
27 radial direction
28 head
29 leg
30 angle
31 foot 32 inner circumferential surface
33 outer circumferential surface
34 channel

The invention claimed is:

1. A mixing cartridge (1) for a sanitary faucet, comprising:
a mixing chamber (2) having at least one hot-water inlet (3) for hot water and at least one cold-water inlet (4) for cold water, and
a vortex element (5) for at least partially swirling the hot water and the cold water in the mixing chamber (2),
wherein the vortex element (5) comprises a plurality of outer wedge-shaped vortex bodies (6) and a plurality of inner wedge-shaped vortex bodies (7),
wherein the outer wedge-shaped vortex bodies (6) are spaced outside of the inner wedge-shaped vortex bodies (7) in a radial direction (27) orthogonal to a longitudinal axis (17) of the mixing cartridge (1).

2. The mixing cartridge (1) according to claim 1, wherein the outer wedge-shaped vortex bodies (6) and the inner wedge-shaped vortex bodies (7) are formed at a sleeve (8).

3. The mixing cartridge (1) according to claim 1, wherein the outer wedge-shaped vortex bodies (6) and the inner wedge-shaped vortex bodies (7) are disposed in an annular manner.

4. The mixing cartridge (1) according to claim 1, wherein the outer wedge-shaped vortex bodies (6) are spaced apart from one another in a circumferential direction (9).

5. The mixing cartridge (1) according to claim 1, wherein the inner wedge-shaped vortex bodies (7) are spaced apart from one another in a circumferential direction (9).

6. The mixing cartridge (1) according to claim 1, wherein the outer wedge-shaped vortex bodies (6) and the inner wedge-shaped vortex bodies (7) are offset from one another in a circumferential direction (9).

7. The mixing cartridge (1) according to claim 1, wherein the inner wedge-shaped vortex bodies (7) are attached to the outer wedge-shaped vortex bodies (6).

8. The mixing cartridge (1) according to claim 1, wherein the vortex element (5) encompasses a regulating element (10) for regulating the mixed-water temperature of the mixing water.

9. The mixing cartridge (1) according to claim 8, wherein the vortex element (5) is disposed in an annular gap (11) between the regulating element (10) and a housing (12) of the mixing cartridge (1).

10. The mixing cartridge (1) according to claim 8, comprising a control gate valve (13) for regulating a flow of the hot water through the hot-water inlet (3) and a flow of the cold water through the cold-water inlet (4), wherein the regulating element (10) can move the control gate valve (13) in an axial direction (14) of the mixing cartridge (1), and wherein a first number of cold-water channels (15) for the cold water and a second number of hot-water channels (16) for the hot water are formed in the control gate valve (13), and wherein the first number and the second number deviate from a third number of the outer wedge-shaped vortex bodies (6) and a fourth number of the inner wedge-shaped vortex bodies (7).

11. The mixing cartridge (1) according to claim 1, wherein the outer wedge-shaped vortex bodies (6) comprise a head (28) and two legs (29) extending from the head (28) forming an angle (30), and the legs (29) each comprise a foot (31) at an end opposite from the head (28).

12. The mixing cartridge (1) according to claim 1, wherein the inner wedge-shaped vortex bodies (7) comprise a head (28) and two legs (29) extending from the head (28) forming an angle (30), and the legs (29) each comprise a foot (31) at an end opposite from the head (28).

13. The mixing cartridge (1) according to claim 1, wherein the outer wedge-shaped vortex bodies (6) and the inner wedge-shaped vortex bodies (7) each comprise a head (28) and two legs (29) extending from the head (28) forming an angle (30), and the legs (29) each comprise a foot (31) at an end opposite from the head (28).

14. The mixing cartridge (1) according to claim 13, wherein feet (31) of the outer wedge-shaped vortex bodies (6) are attached to feet (31) of the inner wedge-shaped vortex bodies (7).

15. The mixing cartridge (1) according to claim 13, wherein the outer wedge-shaped vortex bodies (6) are formed on an inner circumferential surface (32) of a sleeve (8), and the feet (31) of the inner wedge-shaped vortex bodies (7) are attached to the feet (31) of the outer wedge-shaped vortex bodies (6).

* * * * *